Feb. 13, 1940. C. W. GINTER 2,190,357
REPLACEABLE NEEDLE POINT ADAPTER FOR LUBRICATING DEVICES
Filed June 9, 1937
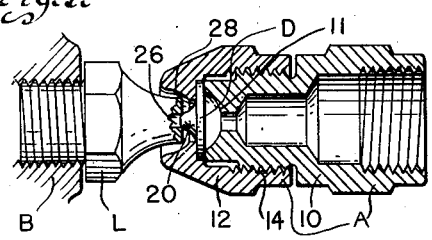
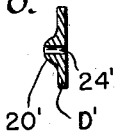
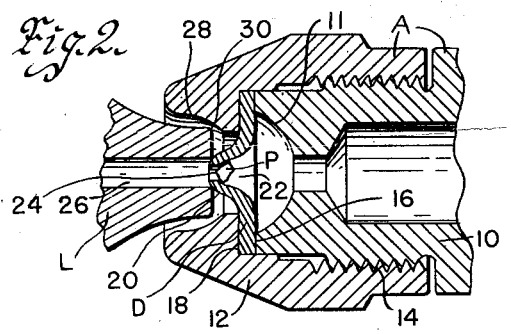
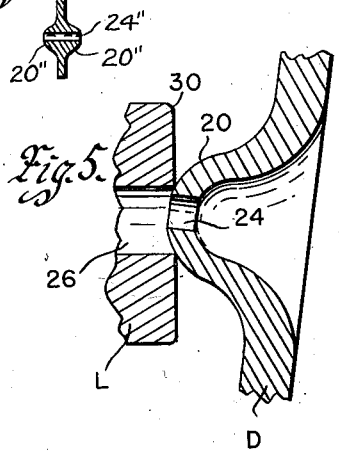
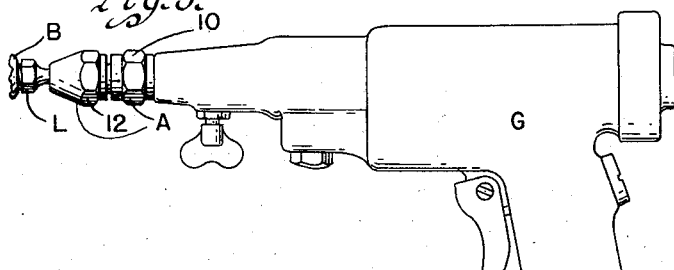
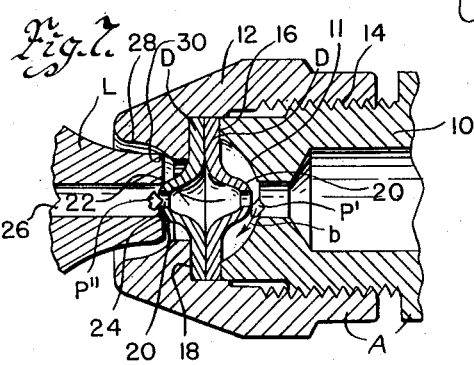
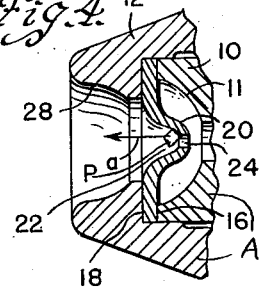
Inventor
Charles W. Ginter
by Bair, Freeman
& Sinclair
Attorneys Patented Feb. 13, 1940

2,190,357

UNITED STATES PATENT OFFICE 2,190,357

REPLACEABLE NEEDLE POINT ADAPTER FOR LUBRICATING DEVICES

Charles W. Ginter, Bryan, Ohio, assignor to The Aro Equipment Corporation, Bryan, Ohio, a corporation of Ohio Application June 9, 1937, Serial No. 147,272

1 Claim. (Cl. 285—161)

An object of my present invention is to provide a very inexpensive replaceable needle point element for adapters used in connection with lubricating devices.

A further object is to provide such a replaceable element which is readily manufactured by simple stamping and drilling operations and yet the replaceable element can be formed so that it can readily be sealed in an adapter fitting and will effectively coact with the small bores ordinarily provided in lubricant reception fittings and nipples.

A further object is to provide a lubricant discharge fitting with a replaceable element therein comprising a disk for interposition between two separable parts of the discharge fitting, such element having a projection adapted for contact with the bore of a grease reception fitting and having a capillary perforation therein through which the lubricant enters such bore.

Another object is to provide an inexpensive replaceable element for a needle point adapter or lubricant discharge fitting which eliminates the necessity of providing a relatively long sleeve as in the usual types of needle point adapters and which is provided with a projection which is concavo-convex and thereby having a relatively thin upper end which is drilled through to provide a bore for the lubricant in its passage from the replaceable element to the grease reception fitting.

A further object is to provide such a replaceable element so constructed that the length of the capillary bore is substantially no greater than the diameter of the bore itself and yet sufficient stock is provided surrounding the bore to provide the necessary strength for lubricating operations, the capillary bore being substantially one thirty-second of an inch in diameter. The fitting into which the needle adapter projects is usually about one-sixteenth of an inch in diameter. The relative sizes are important in that the lubricating device having the needle adapter may be arranged substantially at an angle and yet the parts interfit to allow the minimum pounds pressure necessary for holding the lubricating device against the fitting. The needle adapter having the small capillary bore, notwithstanding its small size, contains sufficient material or stock surrounding the bore to allow angular positioning of the lubricating device relative to the fitting with full metal to metal contact between the adapter and the fitting, eliminating any possibility of the lubricant leaking past the adjacent edges of the bores of the adapter and lubricant reception nipple.

Another object is to provide a replaceable grease fitting engaging element for grease guns and the like which minimizes clogging of the capillary bore, necessary in adapters of the type for needle point coaction with the bore of a lubricant reception fitting, particularly by providing one which has a relatively short bore and which can be removed and reversed in the adapter for cleaning purposes. Thereafter it may be reversed to its original position for lubricating purposes.

A further object is to provide a needle point adapter having a replaceable element so constructed that a pair of elements may be arranged therein to simplify the cleaning operation in the event of clogging.

A further object is to provide a needle point adapter having a replaceable element which may be readily constructed by the screw machine process if desired.

With these and other objects in view my invention consists in the construction, arrangement and combination of the various parts of my device, whereby the objects contemplated are attained, as hereinafter more fully set forth, pointed out in my claim and illustrated in the accompanying drawing, in which:

Figure 1 is an enlarged sectional view through a needle point adapter having a replaceable lubricant reception nipple engaging element therein showing it in contact with a lubricant reception nipple.

Figure 2 is a view similar to Figure 1, on a more greatly enlarged scale.

Figure 3 is a side elevation of the needle point adapter showing it coacting with a lubricant reception fitting and mounted on a lubricant gun.

Figure 4 is a sectional view of a portion of Figure 2 showing the replaceable element in the adapter reversed for cleaning out the foreign matter lodged therein, as illustrated in Figure 2.

Figure 5 is a more greatly enlarged sectional view of a portion of Figure 2 showing how the replaceable element may be tipped to various angles and still secure proper seal between the grease reception fitting and the replaceable element.

Figures 6 and 6a are sectional views through slightly modified forms of my replaceable element; and Figure 7 is a sectional view similar to Figure 2 showing how two of the replaceable elements may be used to secure further advantages as will hereinafter appear.

On the accompanying drawing I have used the reference character G to indicate a lubricant gun of the high pressure type, such as one developing over 5000 lbs. per sq. in. My replaceable needle point adapter is indicated generally by the reference character A and a lubricant discharge fitting is indicated at L. The adapter A comprises an inner sleeve 10 and an outer retainer 12. The two are threaded together as indicated at 14.

A replaceable disk D is illustrated, confined between a shoulder 16 of the sleeve 10 and a shoulder 18 of the retainer 12. These shoulders are finished smoothly so that when the parts 10 and 12 are threaded tightly together by means of a wrench, a seal is provided between the shoulders 16 and 18 and the disk D to prevent the escape of lubricant, event under extremely high pressures.

The disk D is obviously replaceable by unscrewing the retainer 12 from the sleeve 10 and is also reversible as shown in Figure 4, the threads 14 being of sufficient extent to permit two of the disks to be inserted in the adapter A, as shown in Figure 7, if desired.

The disk D is preferably formed of a stamping having a projection 20 threaded in a semi-globular head. This projection is preferably concavo-convex, with the inner surface or depression indicated at 22 sufficiently deep to stretch the material and reduce its thickness at the outer end of the projection, which end is provided with a capillary bore indicated at 24. This bore is of less diameter than the bore 26 of the lubricant reception fitting L, as best shown in Figure 5, to provide sufficient stock between the edges of the two bores for sealing purposes, even when the disk D is forced against the lubricant reception fitting L at an angle, as illustrated. The disk D is of sufficient thickness to have the necessary strength for preventing its buckling under the force of the lubricant at high pressure, and preferably not more than one thirty-second of an inch.

By making the projection 20 concavo-convex, the bore 24 is relatively short and is shortened further by the stretching of the material of the disk where the projection 20 is formed. This materially reduces the likelihood of clogging, since the bore 24 is so short that ordinarily any small particle of foreign matter in the lubricant getting into the bore can pass on through it instead of lodging in it, as when relatively long bores are provided, particularly where such bores are continuations of slightly larger bores.

Although likelihood of clogging is reduced to a minimum, by such an arrangement, it is, of course, obvious that any particle larger than the bore and of sufficient rigidity to resist breaking into smaller pieces under the high pressure of the lubricant being dispensed, will clog the bore 24, as illustrated by the particle P in Figure 2.

Thereupon the particle can be removed by separating the parts 10 and 12 of the adapter and reversing the disk D as shown in Figure 4 and then discharging a shot of lubricant from the adapter. This will force the particle out of the depression 22 of the disk as indicated by the arrow $a$ whereupon the disk can be reversed and lubricating operations continued.

The disk D can also be made as a screw machine part, such a disk being shown at P' in Figure 6. It has the projection 20' and a bore 24'. The bore is somewhat longer due to the projection not being concavo-convex, but nevertheless a relatively short bore 24' is thus provided, as distinguished from long sleeve-like bores. The replaceable disk D' will considerably reduce clogging as distinguished from long sleeve-like bores, although not to quite the extent of the disk D.

This replaceable element as shown in Figure 6a has a projection 20'' on each end thereof. With such a construction the element is reversible in the manner hereinafter described in connection with Figure 7.

I have shown in Figure 7 two of the disks D, used back to back with their projections arranged in opposition to each other. This facilitates the cleaning operation as when a particle such as P' becomes lodged in the bore of the inner disk, it may be expelled by reversing the disks, whereupon it will assume the position P''. Thereafter the lubricating operations can be continued without the necessity of again reversing the disks. When the disks are arranged as illustrated, the projection of the inner one tends to deflect the particle P in the direction of the arrow $b$, thus further reducing the likelihood of clogging.

I have provided an element which is readily replaceable with but a minimum of expense and which therefore can be removed and thrown away after clogging if it is clogged so tightly that it is difficult to unclog it by the pressure of the lubricant. Furthermore, the relatively short bore, being substantially no longer than its diameter, reduces the likelihood of clogging to a minimum.

The retainer 12 is preferably provided with a guiding socket 28 adapted to coact with the peripheral edge 30 of the lubricant fitting L during the association of the adapter with the lubricant fitting and thus effectively guide the projection 20 to coacting position relative to the bore 26 of the fitting L. This is a substantial aid in quickly associating the adapter with the fitting.

Although I have illustrated the fitting L as being a Zerk fitting, it obviously can be any type having a bore slightly larger than the bore 24 and yet small enough to effect a seal by contact of its periphery with the projection 20.

If at any time the disk element D becomes damaged or lost and the operator does not have another one to replace it, the sleve 12 can be removed and the spherical concave seat 11 of the fitting part 10 placed against the lubricant reception fitting L in the ordinary manner. Such coaction of the adapter and fitting, of course, requires greater pressure than when the needle point disk is used for coaction with the bore 26 of the fitting L, which has a much smaller area.

Some changes may be made in the construction and arrangement of the parts of my device without departing from the real spirit and purpose of my invention, and it is my intention to cover by my claim any modified forms of structure or use of mechanical equivalents which may be reasonably included within their scope.

I claim as my invention:

A needle point adapter for lubricating devices comprising a fitting having at least two parts, forming thereby a receiving chamber, said parts having opposite faces, a pair of similar disk elements each having a central protuberance formed on one face which is perforated with a capillary bore, said disk elements being positioned within said receiving chamber and confined between said opposite faces with their protuberances extending in opposite directions, whereby said disk elements may be reversed within said chamber for cleaning purposes and used for lubricating purposes in either of their reversed positions.

CHARLES W. GINTER.